United States Patent
Lee et al.

(10) Patent No.: US 10,785,807 B2
(45) Date of Patent: Sep. 22, 2020

(54) METHOD FOR TRANSMITTING RANDOM ACCESS CHANNEL (RACH) SIGNAL IN WIRELESS COMMUNICATION SYSTEM, AND TERMINAL THEREFOR

(71) Applicant: LG ELECTRONICS INC., Seoul (KR)

(72) Inventors: Hojae Lee, Seoul (KR); Sangrim Lee, Seoul (KR); Dongkyu Kim, Seoul (KR); Kwangseok Noh, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/082,258

(22) PCT Filed: Mar. 6, 2017

(86) PCT No.: PCT/KR2017/002383
§ 371 (c)(1),
(2) Date: Sep. 4, 2018

(87) PCT Pub. No.: WO2017/150951
PCT Pub. Date: Sep. 8, 2017

(65) Prior Publication Data
US 2019/0090272 A1   Mar. 21, 2019

Related U.S. Application Data

(60) Provisional application No. 62/303,395, filed on Mar. 4, 2016, provisional application No. 62/308,836, filed on Mar. 15, 2016.

(51) Int. Cl.
*H04W 74/08* (2009.01)
*H04L 5/00* (2006.01)
(Continued)

(52) U.S. Cl.
CPC ......... *H04W 74/085* (2013.01); *H04L 5/0053* (2013.01); *H04L 5/0091* (2013.01);
(Continued)

(58) Field of Classification Search
CPC ....... H04L 1/0068; H04L 5/00; H04L 5/0053; H04L 5/0091; H04L 27/2607;
(Continued)

(56) References Cited

U.S. PATENT DOCUMENTS

2013/0201885 A1   8/2013   Yang et al.
2013/0286907 A1*  10/2013  Wei ..................... H04W 28/06
                                                    370/281
(Continued)

FOREIGN PATENT DOCUMENTS

KR   1020150113072   10/2015
WO   2013055173     4/2013

OTHER PUBLICATIONS

PCT International Application No. PCT/KR2017/002383, Written Opinion of the International Searching Authority dated Jun. 8, 2017, 13 pages.
(Continued)

*Primary Examiner* — Khoa Huynh
(74) *Attorney, Agent, or Firm* — Lee Hong Degerman Kang & Waimey

(57) ABSTRACT

A method by which a terminal transmits a random access channel (RACH) signal in a wireless communication system comprises the step of transmitting the RACH signal to a base station according to an RACH format corresponding to a specific RACH subframe among previously defined RACH formats, wherein the method is configured such that a start point or an end point of the RACH signal in a time domain is differentiated according to whether a downlink control zone and an uplink control zone within the RACH subframe are punctured in a specific frequency band between the previously defined RACH formats.

16 Claims, 9 Drawing Sheets

(51) Int. Cl.
  *H04L 27/26* (2006.01)
  *H04W 72/04* (2009.01)
  *H04L 1/00* (2006.01)
  *H04W 74/00* (2009.01)

(52) U.S. Cl.
  CPC ...... *H04L 27/2607* (2013.01); *H04L 27/2678* (2013.01); *H04W 72/0453* (2013.01); *H04L 1/0068* (2013.01); *H04L 27/2613* (2013.01); *H04W 74/004* (2013.01)

(58) Field of Classification Search
  CPC ............. H04L 27/2613; H04L 27/2678; H04L 5/0028; H04W 72/04; H04W 72/0453; H04W 74/00; H04W 74/004; H04W 74/085; H04W 28/06; H04W 74/006
  See application file for complete search history.

(56) References Cited

U.S. PATENT DOCUMENTS

2018/0083761 A1* 3/2018 Kishiyama ............ H04L 5/0028
2018/0316474 A1* 11/2018 Mukherjee .......... H04W 74/006

OTHER PUBLICATIONS

Intel, "NB-PRACH and random access procedure", 3GPP TSG RAN WG1 Meeting #84, R1-160415, Feb. 2016, 5 pages.
Ericsson, "NB-IoT—Random access", 3GPP TSG RAN WG1 Meeting #84, R1-160278, Feb. 2016, 5 pages.

* cited by examiner

METHOD FOR TRANSMITTING RANDOM ACCESS CHANNEL (RACH) SIGNAL IN WIRELESS COMMUNICATION SYSTEM, AND TERMINAL THEREFOR

CROSS-REFERENCE TO RELATED APPLICATIONS

This application is the National Stage filing under 35 U.S.C. 371 of International Application No. PCT/KR2017/002383, filed on Mar. 6, 2017, which claims the benefit of U.S. Provisional Application No. 62/303,395, filed on Mar. 4, 2016 and 62/308,836, filed on Mar. 15, 2016, the contents of which are all hereby incorporated by reference herein in their entireties.

TECHNICAL FIELD

The present invention relates to wireless communication, and more particularly, to a method of transmitting a random access channel (RACH) signal in a wireless communication system and a user equipment (UE) therefor.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

Although 5G communication system requires a new frame structure to solve the abovementioned problem, the new frame structure has not been proposed yet.

DISCLOSURE OF THE INVENTION

Technical Tasks

A technical task of the present invention is to provide a method for a user equipment to transmit a random access channel (RACH) signal in a wireless communication system.

Another technical task of the present invention is to provide a user equipment transmitting a random access channel (RACH) signal in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a random access channel (RACH), which is transmitted by a user equipment in a wireless communication system, includes the step of transmitting the RACH signal to a base station according to an RACH format corresponding to a specific RACH subframe in predefined RACH formats.

In this case, the predefined RACH formats may be configured that a starting point or an ending point of the RACH signal is distinguished in a time domain according to whether or not puncturing is performed on a specific frequency band of a downlink control zone and an uplink control zone in the specific RACH subframe. The method may further include the step of receiving information on the predefined RACH formats from the base station.

The RACH format corresponding to the specific RACH subframe corresponds to a format that the downlink control zone and the uplink control zone are not punctured on the specific frequency band in the specific RACH subframe and the RACH signal can be transmitted from a symbol appearing after the downlink control zone according to the RACH format.

The RACH format corresponding to the specific RACH subframe corresponds to a format that the downlink control zone is punctured only on the specific frequency band among the downlink control zone and the uplink control zone in the specific RACH subframe and the RACH signal can be transmitted from a first symbol of the downlink control zone according to the RACH format.

The RACH format corresponding to the specific RACH subframe corresponds to a format that the uplink control zone is punctured only on the specific frequency band in the downlink control zone and the uplink control zone in the specific RACH subframe and the RACH signal can be transmitted in symbol duration corresponding to the uplink control zone from a symbol appearing after the downlink control zone according to the RACH format.

The RACH format corresponding to the specific RACH subframe corresponds to a format that both the downlink control zone and the uplink control zone are punctured on the specific frequency band in the specific RACH subframe and the RACH signal can be transmitted in duration ranging from a symbol appearing after the downlink control zone to a symbol before the uplink control zone according to the RACH format.

The specific frequency band corresponds to a center frequency of a prescribed number of resource blocks (RBs) and the RACH signal may be transmitted on the center frequency.

The method can further include the step of receiving at least one of allocation information of the specific RACH subframe for transmitting the RACH signal and information on the specific frequency band from the base station. The RACH signal can include a CP (cyclic prefix) and a RACH sequence. The user equipment may correspond to a user equipment performing initial access RACH.

To further achieve these and other advantages and in accordance with the purpose of the present invention, according to a different embodiment, a user equipment transmitting a random access channel (RACH) in a wireless communication system includes a transmitter and a processor, the processor configured to control the transmitter to transmit the RACH signal to a base station according to an RACH format corresponding to a specific RACH subframe in predefined RACH formats. In this case, a starting point and an ending point of the RACH signal between the predefined RACH formats can be configured to be distinguished in a time domain according to whether or not puncturing is performed on a specific frequency band of a downlink control zone and an uplink control zone in the specific RACH subframe.

The user equipment can further include a receiver. The processor can control the receiver to receive information on the predefined RACH formats from the base station.

The RACH format corresponding to the specific RACH subframe corresponds to a format that the downlink control zone and the uplink control zone are not punctured on the specific frequency band in the specific RACH subframe and the processor can to control the transmitter to transmit the RACH signal from a symbol appearing after the downlink control zone according to the RACH format.

The RACH format corresponding to the specific RACH subframe corresponds to a format that the downlink control zone is punctured only on the specific frequency band in the downlink control zone and the uplink control zone in the specific RACH subframe and the processor can control the transmitter to transmit the RACH signal from a first symbol of the downlink control zone according to the RACH format.

The RACH format corresponding to the specific RACH subframe corresponds to a format that the uplink control zone is punctured only on the specific frequency band among the downlink control zone and the uplink control zone in the specific RACH subframe and the processor can control the transmitter to transmit the RACH signal in symbol duration corresponding to the uplink control zone from a symbol appearing after the downlink control zone according to the RACH format.

The RACH format corresponding to the specific RACH subframe corresponds to a format that both the downlink control zone and the uplink control zone are punctured on the specific frequency band in the specific RACH subframe and the processor can control the transmitter to transmit the RACH signal in duration ranging from a symbol appearing after the downlink control zone to a symbol before the uplink control zone according to the RACH format.

Advantageous Effects

When length extension of an RACH sequence is inevitable to compensate for a difference between uplink power and downlink power, since a TDD new frame structure includes a downlink control zone/uplink control zone in every subframe, it is able to solve a problem that the length extension of the RACH sequence is restricted and a problem that the downlink control zone and/or the uplink control zone are punctured.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present invention. And, the use of the specific terminology can be modified into another form within the scope of the technical idea of the present invention.

Figure 1:
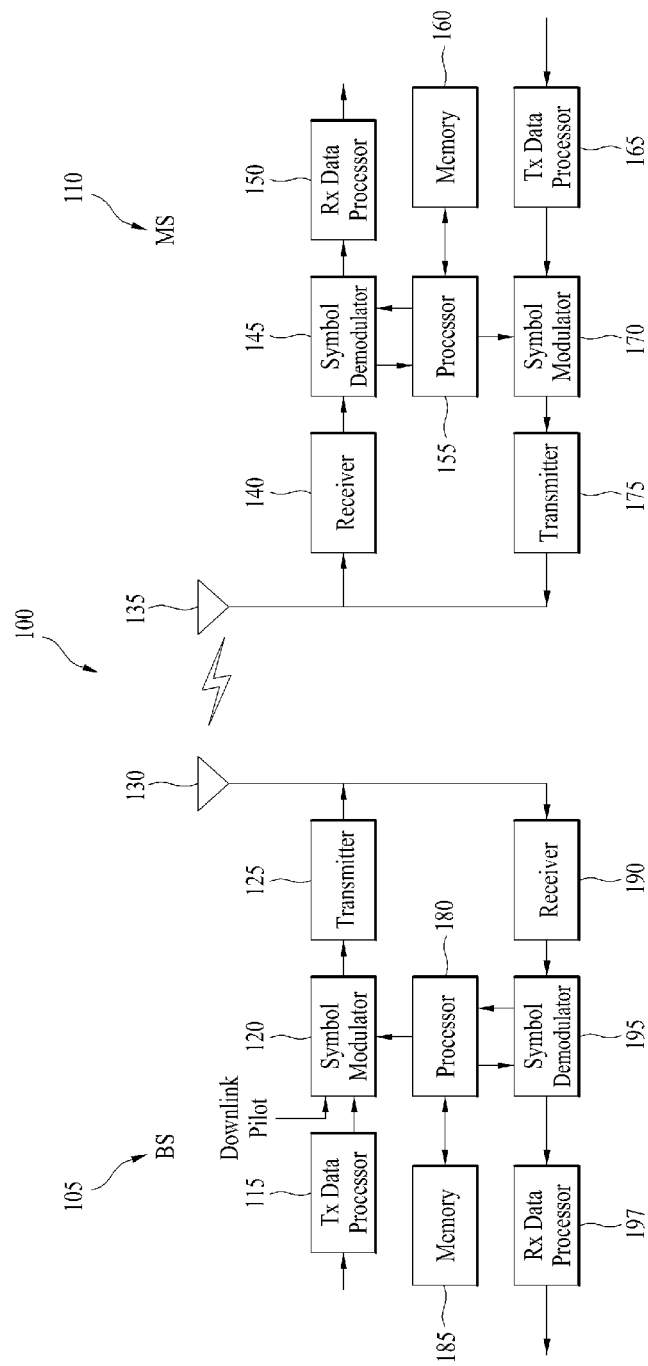
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a 5th generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
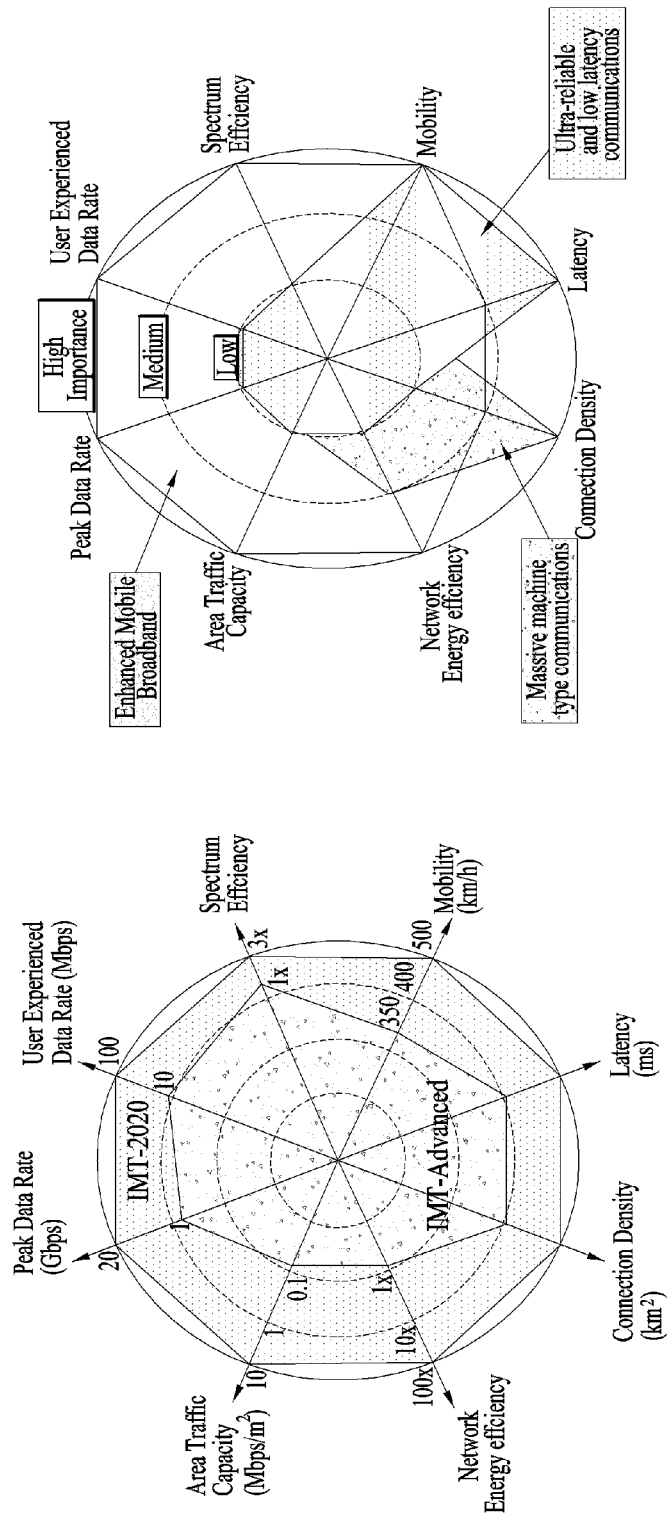
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <$10^{-6}$).

Figure 3:
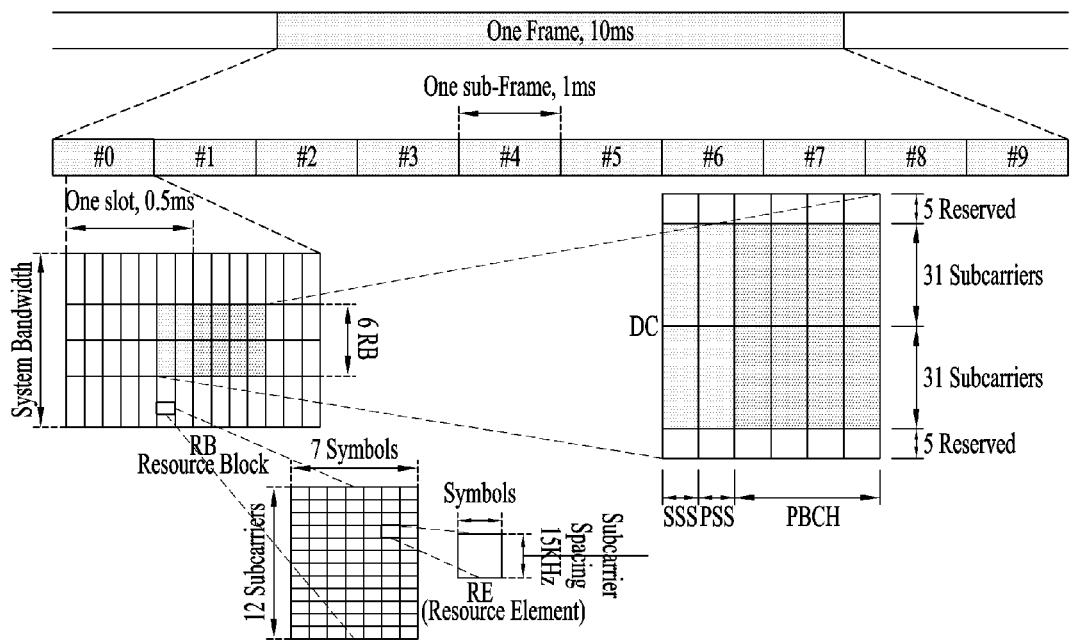
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes 10 1-ms subframes. One subframe includes 2 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers a primary synchronization signal (PSS) and a secondary synchronization signal (SSS) for synchronization a physical broadcast channel (PBCH) for system information in a center frequency (6 RBs). In this case, it may have a difference in the frame structure and positions of the signal and the channel depending on a normal/extended CP (cyclic prefix) and TDD (Time Division Duplex)/FDD (Frequency Division Duplex).

Figure 4:
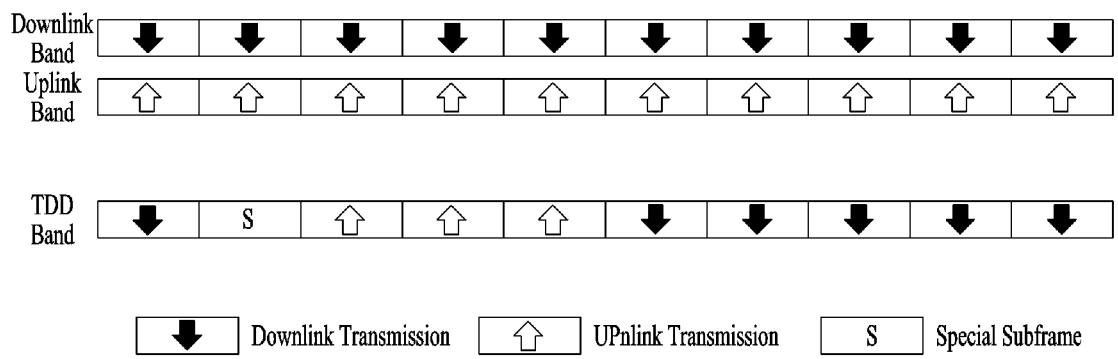
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5:
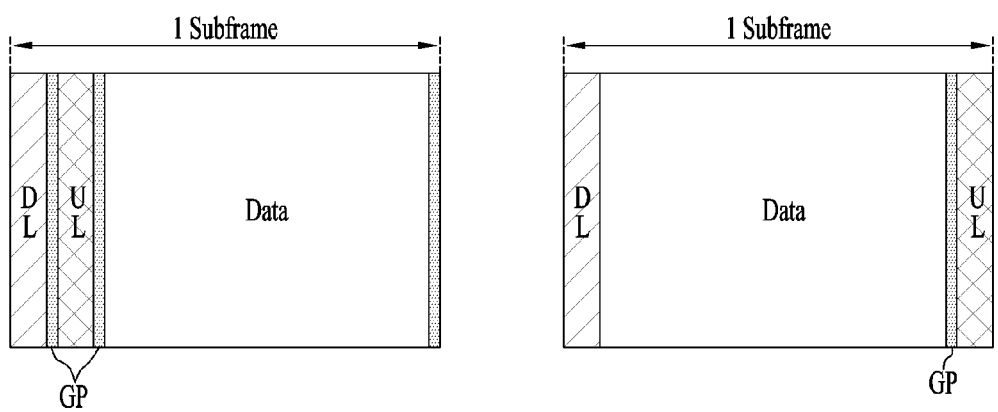
FIG. 5 is a diagram for an example of a self-contained subframe structure.

FIG. 5 is a diagram for an example of a self-contained subframe structure.

FIG. 5 illustrates a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference issue between downlink and uplink, and a resource section for data transmission in a single subframe.

FIG. 5(a) shows an example of a self-contained subframe structure. A subframe is configured in an order of a resource section for downlink, a resource section for uplink, and a resource section for data and a GP exists between the resource sections. In FIG. 5(a), a downlink resource section represented as DL may correspond to a resource section for a downlink control channel and an uplink resource section represented as UL may correspond to a resource section for an uplink control channel.

FIG. 5(b) shows a different example of a self-contained subframe structure. A subframe is configured in an order of a resource section for downlink, a resource section for data, and a resource section for uplink and a GP exists prior to the resource section for uplink only. In FIG. 5(b), a downlink resource section represented as DL may correspond to a resource section for a downlink control channel and an uplink resource section represented as UL may correspond to a resource section for an uplink control channel.

In legacy LTE system, if maximum transmit power of a base station corresponds to 46 dBm and maximum transmit power of a UE corresponds to 23 dBm, a coverage difference exists in the aspect of downlink (DL)/uplink (UL) synchronization. Hence, in order to extend coverage of UL synchronization, power compensation is necessary. In case of a legacy LTE system, it was able to increase the coverage of an uplink synchronization signal with longer symbol duration via a special RACH frame. However, if 5G New RAT frame structure is configured based on a self-contained subframe structure shown in FIG. 5, it is necessary to allocate a downlink control region (or a resource region for transmitting a downlink control channel and downlink control information, it can also be referred to as a downlink control zone) and an uplink control region (or a resource region for transmitting an uplink control channel and uplink control information, it can also be referred to as an uplink control zone) within a subframe. As a result, a problem of setting a limit on a region for increasing coverage of uplink synchronization occurs. If a UL synchronization signal is transmitted in a special RACH frame irrespective of the downlink control region, a different UE receiving downlink control information or a user may have considerable amount of interference. Hence, it is necessary to design a RACH frame structure to transmit an uplink synchronization signal of a self-contained frame structure for a next generation 5G system. The present invention proposes a method of designing an RACH capable of maximizing uplink synchronization coverage and DL/UL flexibility of a self-contained frame structure.

The present invention proposes a method of designing an RACH that maximizes not only DL/UL flexibility of a self-contained frame structure and a new frame structure for 5G TDD system but also uplink synchronization coverage. Moreover, the present invention can be identically applied to an adaptive/self-contained frame and a new frame structure for a 5G FDD system as well. In the following description of the present invention, puncturing means that a resource is not allocated. In particular, puncturing means that information is not transmitted to a corresponding resource.

As mentioned in the foregoing description, it is necessary for a self-contained subframe structure to keep or allocate a downlink control region and an uplink control region. In this case, a region for increasing coverage of uplink synchronization can be restricted. If an uplink synchronization signal is transmitted in a special RACH frame irrespective of the downlink control region, a different UE receiving downlink/uplink control information or a user may have a considerable amount of interference. In particular, it is necessary to design an RACH frame in a manner that a downlink/uplink control channel is not duplicated or overlapped with an RACH signal. Table 1 in the following shows brief explanation on signs and parameters to be written for the description of the present invention. The explanation on the parameters described in Table 1 can be applied throughout the present invention.

TABLE 1

| Parameter | Description | Note |
|---|---|---|
| T_s | Total Symbol duration | T_s = T_u + T_cp |
| T_u | Useful Symbol Duration | Fixed |
| T_cp | CP Length | Fixed |
| M | # of symbols in a RACH subframe | Fixed |
| n | # of DL control symbols of the DL control zone in a RACH subframe | |
| m | # of UL control symbols of the DL control zone in a RACH subframe | |
| T_tr | Transition Time from Transmit (DL) to Receive (UL) at the eNB | Fixed |
| T_rach | RACH sequence Length | |
| T_rach_cp | CP Length of a RACH sequence | T_rach_cp = T_RTT + T_delay |
| T_guard | Guard Period behind of a RACH sequence | |
| T_blank | Guard Period ahead of a RACH sequence | |
| T_RTT | Maximum Round Trip Time for cell-edge users | |
| T_delay | Maximum delay spread Length | Fixed |
| P_DL | Power of a DL synchronization signal (or sequence) | Fixed |
| P_UL | Power of a UL synchronization signal (or sequence) | Fixed |
| P_C | Power Compensation Factor for DL/UL Common Coverage | P_C = P_DL/P_UL |

Embodiment 1: Non-Puncturing Based RACH Structure

The present invention proposes an RACH subframe structure of a self-contained frame structure for transmitting an uplink synchronization signal (RACH sequence) without influence on a downlink/uplink control zone. For clarity, a TDD new frame structure is explained as an example among the self-contained frame structures. As mentioned in the foregoing description, the present invention can be applied not only to the TDD new frame structure but also to a FDD new frame structure and a self-contained frame structure.

Figure 6:
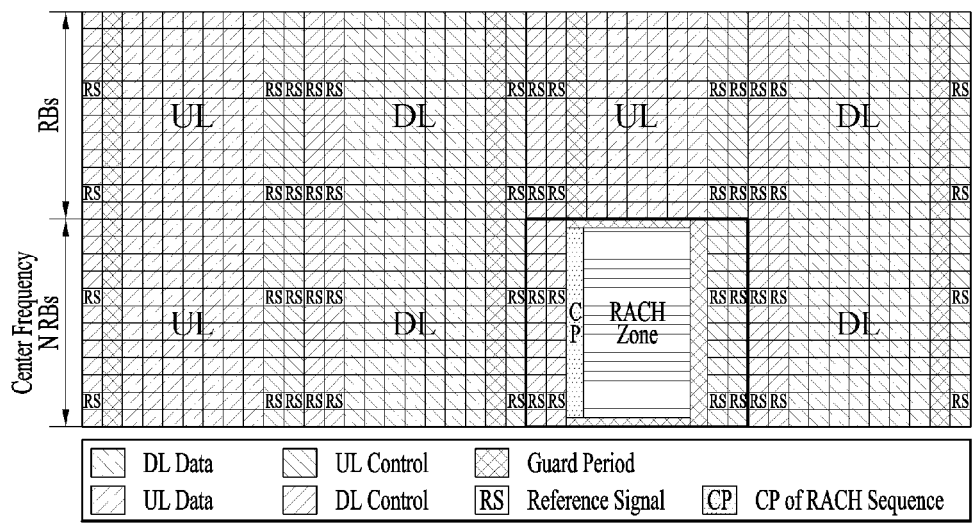
FIG. 6 is a diagram illustrating a concept of a non-puncturing based RACH subframe of a TDD new frame structure.

FIG. 6 is a diagram illustrating a concept of a non-puncturing based RACH subframe of a TDD new frame structure.

In general, the first n (n is an integer equal to or greater than 1) number of symbols in a subframe can be configured as a downlink control zone and the last m (m is an integer equal to or greater than 1) number of symbols in a subframe can be configured as an uplink control zone in a TDD new frame structure. If an RACH sequence having long duration is applied to secure uplink coverage, the RACH sequence is unable to invade the downlink control zone or the uplink control zone or is unable to be overlapped with the zones. Hence, when the number of symbols included in one subframe corresponds to M, a length of the RACH sequence corresponds to {M−(n+m)}*T_s (in this case, T_s corresponds to Total Symbol duration). Then, it is necessary to design an RACH within the {M−(n+m)}*T_s including a CP (cyclic prefix) and a GP (guard period) for the RACH sequence. In particular, it is able to represent the {M−(n+m)}*T_s as T_rach_cp+T_rach+T_guard and a power compensation coefficient can be represented as T_rach/T_u=P_c. In this case, if P_DL/P_UL=P_c is satisfied, since downlink synchronization signal power becomes identical with uplink synchronization signal power, coverage between DL and UL is identically maintained. In this case, in order to make an RACH not to invade a downlink control region, a UE does not transmit an RACH sequence during T_blank duration and a length of the T_blank is identical with n*T_s. Since the abovementioned method is restricted by T_rach={M−(n+m)}*T_s−T_rach_cp−T_guard, it may be difficult to maintain coverage. However, the method has a merit in that it is able to secure a downlink/uplink control zone in an RACH subframe.

In the method above, T_rach_cp is determined as T_rach_cp={M−(n+m)}*T_s−T_RTT−T_rach and T_guard is determined as T_guard={M−(n+m)}*T_s−T_rach_cp−T_rach. In particular, coverage of an uplink synchronization signal is determined by distributing T_RTT and T_rach within a given {M−(n+m)}*T_s.

However, when a transmit power difference (P_DL/P_UL) between a base station and a UE is considered, the T_rach may have insufficient power compensation in the aspect of DL/UL common coverage. Hence, it is necessary to have a method for increasing coverage of an RACH sequence.

Example of Designing Non-Puncturing Based RACH Subframe

Figure 7:
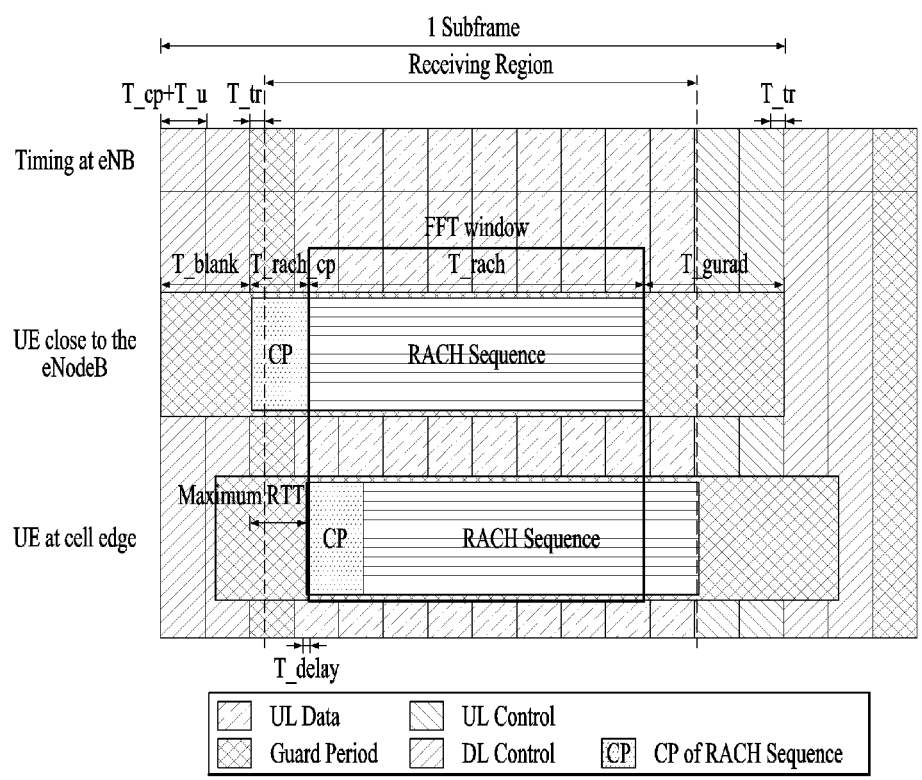
FIG. 7 is a diagram illustrating a non-puncturing based RACH subframe in the aspect of reception of a base station.

FIG. 7 is a diagram illustrating a non-puncturing based RACH subframe in the aspect of reception of a base station.

Referring to FIG. 7, a base station transmits a downlink control symbol in a downlink control zone. And, as shown in FIG. 7, a user or a UE close to the base station transmits an RACH (CP+RACH sequence) after T_blank (in FIG. 7, first two symbols) on the basis of downlink synchronization. If a cell edge user performs downlink synchronization at ½ time of maximum RTT (Round Trip Time) and transmits an RACH in accordance with the downlink synchronization, as shown in FIG. 7, the base station receives an RACH signal from the cell edge user at the timing appearing after the maximum RTT in T_blank duration. If the base station determines a length of an FFT (Fast Fourier Transform) window for an RACH sequence with a length shown in FIG. 7 in consideration of the user close to the base station, the base station is able to receive all RACH signals of users within the maximum RTT.

Embodiment 2: DL Control-Puncturing Based RACH Structure

In order to maximize coverage of an uplink synchronization signal of a self-contained frame structure, one embodiment of the present invention proposes a structure of transmitting a downlink control zone by puncturing the downlink control zone. For clarity, the TDD new frame structure is explained as an example among the self-contained frame structures. As mentioned in the foregoing description, the present invention can be applied not only to the TDD new frame structure but also to an FDD new frame structure and the self-contained frame structure.

Figure 8:
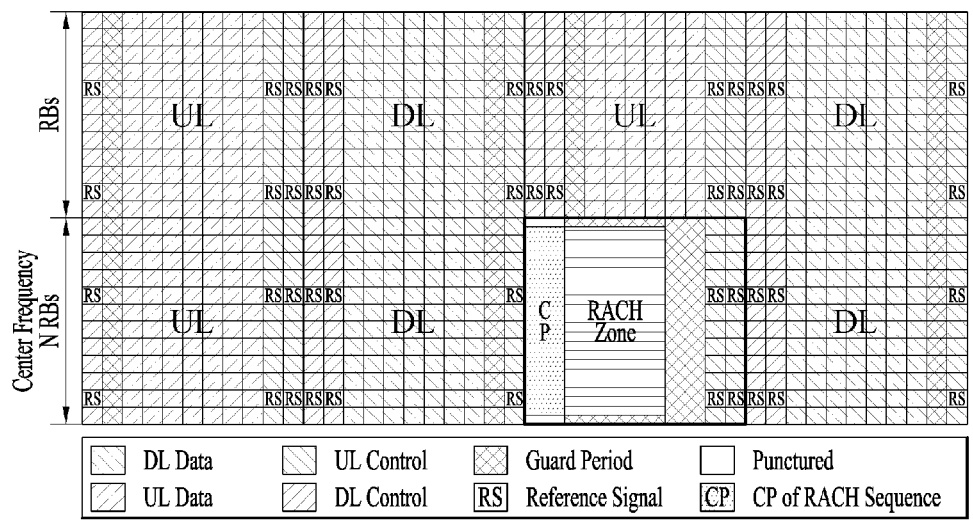
FIG. 8 is a diagram illustrating a concept of a downlink control puncturing based RACH subframe of a TDD new frame structure.

FIG. 8 is a diagram illustrating a concept of a downlink control puncturing based RACH subframe of a TDD new frame structure.

In general, the first n (n is an integer equal to or greater than 1) number of symbols in a subframe can be configured as a downlink control zone and the last m (m is an integer equal to or greater than 1) number of symbols in a subframe can be configured as an uplink control zone in a TDD new frame structure. If an RACH sequence having long duration is applied to secure uplink coverage, the RACH sequence is unable to invade the downlink control zone or the uplink control zone or is unable to be overlapped with the zones. Hence, when the number of symbols included in one subframe corresponds to M, a length of the RACH sequence corresponds to {M−(n+m)}*1 symbols. Then, it is necessary to design an RACH within duration of the {M−(n+m)}*1 symbols including a CP and a GP for the RACH sequence. However, when a transmit power difference between a base station and a UE is considered, the duration of the {M−(n+m)}*1 symbols may have insufficient power compensation in increasing the coverage of the RACH sequence. Hence, the present invention proposes a method of performing puncturing on a downlink control zone to increase the coverage of the RACH sequence.

If it is assumed that an RACH sequence is transmitted on the center frequency of the N number of RBs (resource blocks) in an RACH subframe (in FIG. 8, third subframe from the left), a downlink control zone is punctured at the center frequency of the N number of RBs. For example, a base station does not schedule or allocate downlink control information at the center frequency of the N number of RBs.

If the downlink control information is not scheduled or allocated at the center frequency of the N number of RBs, it is able to have characteristics described in the following. In particular, it is able to transmit a CP for an RACH sequence from the timing of transmitting a downlink control signal transmitted by a base station. And, it is able to guarantee RTT as much as remaining duration resulted from subtracting maximum delay spread duration from CP duration. Although a downlink control signal is not transmitted on the center frequency of an RACH subframe in which an RACH sequence is transmitted, since a downlink control signal is transmitted in a different RB, downlink and uplink coexist in the aspect of the same time. However, since an RACH is received by a base station only and a margin is put by a CP, downlink and uplink exist via FDM. Hence, it is able to perform simultaneous transmission.

Example of Designing Downlink Control-Puncturing Based RACH Subframe

Figure 9:
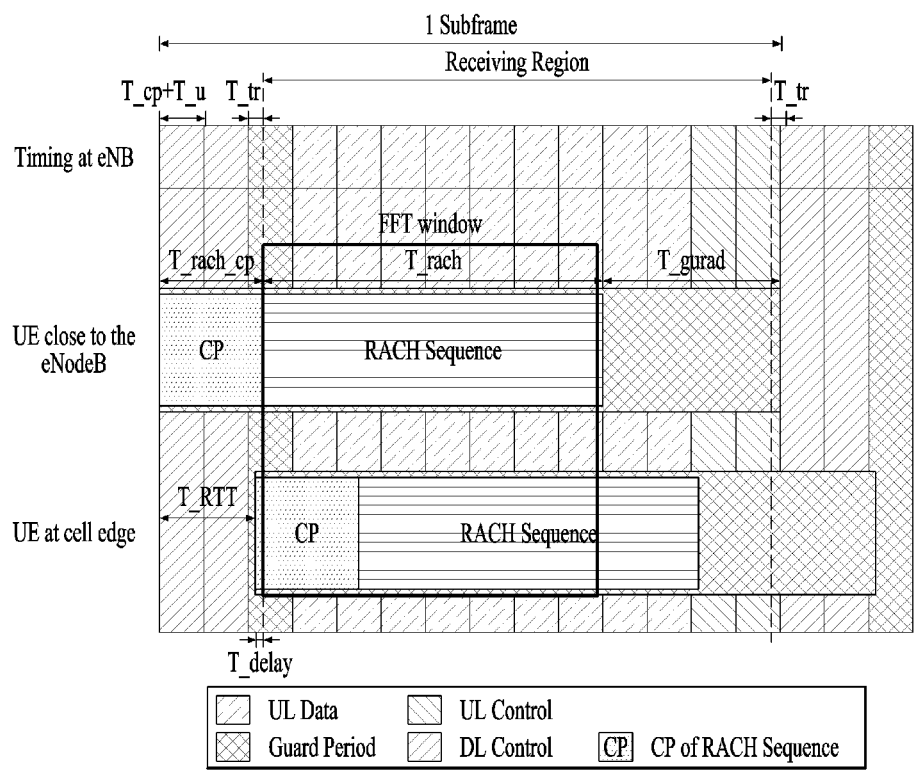
FIG. 9 is a diagram illustrating a downlink-puncturing based RACH subframe structure in the aspect of reception of a base station.

FIG. 9 is a diagram illustrating a downlink-puncturing based RACH subframe structure in the aspect of reception of a base station.

Referring to FIG. 9, a base station transmits a downlink control symbol (or information) in a region rather than the center frequency of the N number of RBs in a downlink control zone and a user or a UE close to the base station transmits an RACH from the timing at which downlink control information shown in FIG. 9 is transmitted on the basis of downlink synchronization (T_blank=0). If a cell edge user performs downlink synchronization at ½ time of maximum RTT and transmits an RACH in accordance with the downlink synchronization, as shown in FIG. 9, the base station receives an RACH signal from the cell edge user at the timing appearing after the maximum RTT. If the base station determines a length of an FFT window for an RACH sequence in consideration of the user close to the base station, the base station is able to receive all RACH signals of users within the maximum RTT.

Embodiment 3: UL Control-Puncturing Based RACH Structure

In order to maximize coverage of an uplink synchronization signal of a self-contained frame structure, a different embodiment of the present invention proposes a structure of transmitting an uplink control zone by puncturing the uplink control zone. For clarity, a TDD new frame structure among the self-contained frame structure is explained as an example. As mentioned in the foregoing description, the present invention can be applied not only to the TDD new frame structure but also to an FDD new frame structure and the self-contained frame structure.

Figure 10:
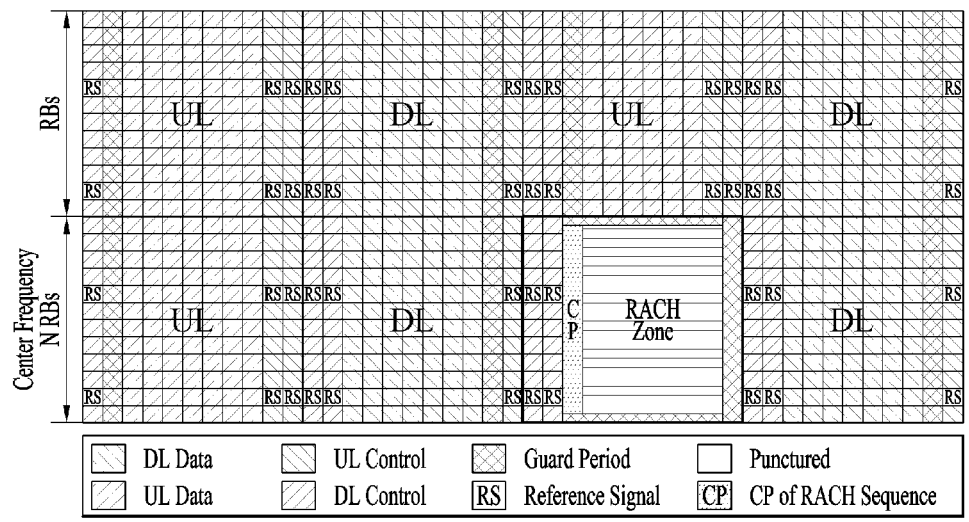
FIG. 10 is a diagram illustrating a concept of an uplink control puncturing based RACH subframe of a TDD new frame structure.

FIG. 10 is a diagram illustrating a concept of an uplink control puncturing based RACH subframe of a TDD new frame structure.

In general, the first n (n is an integer equal to or greater than 1) number of symbols in a subframe can be configured as a downlink control zone and the last m (m is an integer equal to or greater than 1) number of symbols in a subframe can be configured as an uplink control zone in a TDD new frame structure. If an RACH sequence having long duration is applied to secure uplink coverage, the RACH sequence is unable to invade the downlink control zone or the uplink control zone or is unable to be overlapped with the zones. Hence, when the number of symbols included in one subframe corresponds to M, a length of the RACH sequence corresponds to {M−(n+m)}*1 symbols. Then, it is necessary to design an RACH within duration of the {M−(n+m)}*1 symbols including a CP and a GP for the RACH sequence. However, when a transmit power difference between a base station and a UE is considered, the duration of the {M−(n+m)}*1 symbols may have insufficient power compensation in increasing the coverage of the RACH sequence. Hence, the present invention proposes a method of performing puncturing on an uplink control zone to increase the coverage of the RACH sequence.

If it is assumed that an RACH sequence is transmitted on the center frequency of the N number of RBs (resource blocks) in an RACH subframe (in FIG. 10, third subframe from the left), an uplink control zone is punctured at the center frequency of the N number of RBs. For example, a base station does not schedule or allocate uplink control information at the center frequency of the N number of RBs.

If the uplink control information is not scheduled or allocated at the center frequency of the N number of RBs, it is able to have characteristics described in the following. In particular, it is able to transmit an RACH sequence from the timing of transmitting an uplink control signal. And, it is able to guarantee RTT as much as remaining duration resulted from subtracting maximum delay spread duration from CP duration. Although an uplink control signal is not transmitted on the center frequency of an RACH subframe in which an RACH sequence is transmitted, an uplink control signal is transmitted in a different RB. The base station receives an RACH sequence and an uplink control signal (or information) using an frequency division multiplexing (FDM) scheme.

Example of Designing Uplink Control-Puncturing Based RACH Subframe

Figure 11:
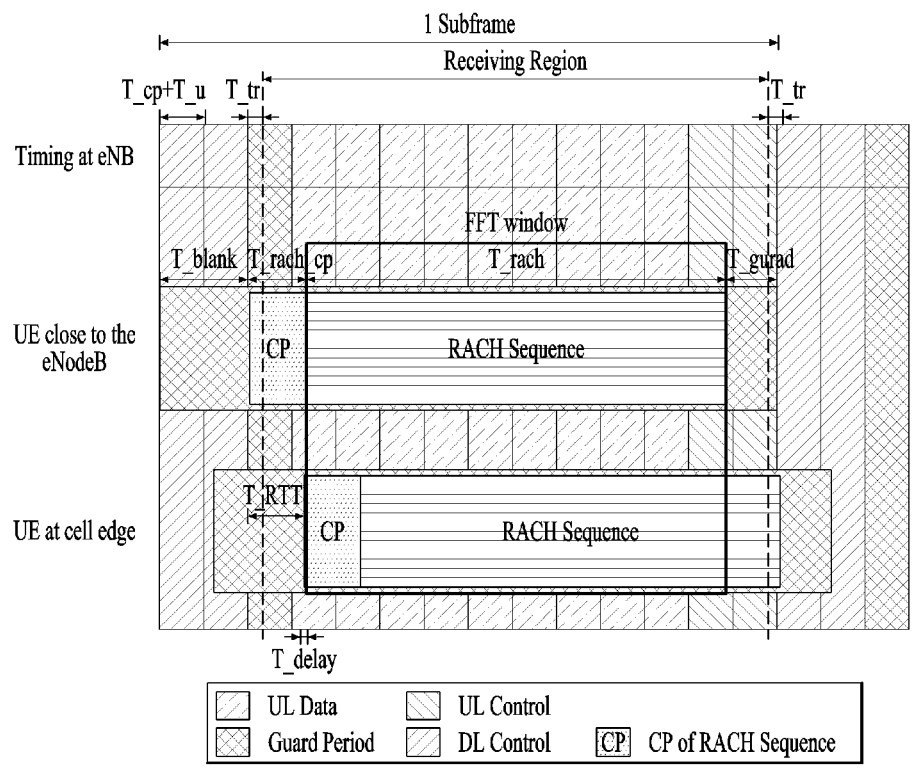
FIG. 11 is a diagram illustrating an uplink control puncturing based RACH subframe structure in the aspect of reception of a base station.

FIG. 11 is a diagram illustrating an uplink control puncturing based RACH subframe structure in the aspect of reception of a base station.

Referring to FIG. 11, a base station receives an uplink control symbol (or information) in a region rather than the center frequency of the N number of RBs in an uplink control zone and a user or a UE close to the base station transmits an RACH after T_blank shown in FIG. 11. If a cell edge user performs downlink synchronization at ½ time of maximum RTT and transmits an RACH in accordance with the downlink synchronization, as shown in FIG. 11, the base station receives an RACH signal from the cell edge user after the maximum RTT. If the base station determines a length of an FFT window for an RACH sequence in consideration of the user close to the base station, the base station is able to receive all RACH signals of users within the maximum RTT. In this case, the base station receives an RACH sequence for the N number of RBs in the uplink control zone and receives uplink in a different RB. In particular, the base station receives the RACH sequence and uplink control information in the uplink control zone using FDM scheme.

Embodiment 4: DL/UL Control-Puncturing Based RACH Structure

In order to maximize coverage of an uplink synchronization signal of a self-contained frame structure, one embodiment of the present invention proposes a structure of transmitting a downlink/uplink control zone by puncturing the downlink/uplink control zone. For clarity, a TDD new frame structure among the self-contained frame structure is explained as an example. As mentioned in the foregoing description, the present invention can be applied not only to the TDD new frame structure but also to an FDD new frame structure and the self-contained frame structure.

Figure 12:
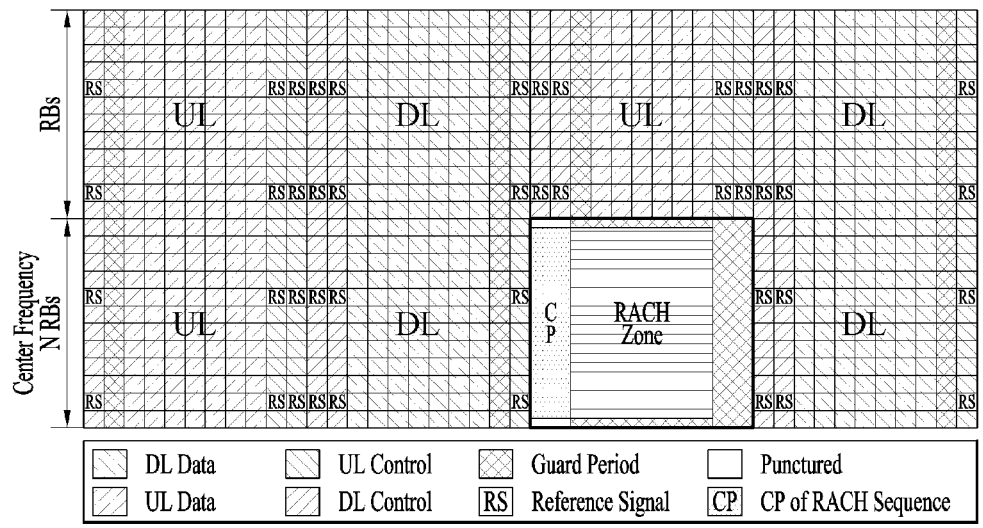
FIG. 12 is a diagram illustrating a concept of a downlink/uplink-puncturing based RACH subframe of a TDD new frame structure.

FIG. 12 is a diagram illustrating a concept of a downlink/uplink-puncturing based RACH subframe of a TDD new frame structure.

In general, the first n (n is an integer equal to or greater than 1) number of symbols in a subframe can be configured as a downlink control zone and the last m (m is an integer equal to or greater than 1) number of symbols in a subframe can be configured as an uplink control zone in a TDD new frame structure. If an RACH sequence having long duration is applied to secure uplink coverage, the RACH sequence is unable to invade the downlink control zone or the uplink control zone or is unable to be overlapped with the zones. Hence, when the number of symbols included in one subframe corresponds to M, a length of the RACH sequence corresponds to {M−(n+m)}*1 symbols. Then, it is necessary to design an RACH within duration of the {M−(n+m)}*1 symbols including a CP and a GP for the RACH sequence. However, when a transmit power difference between a base station and a UE is considered, the duration of the {M−(n+m)}*1 symbols may have insufficient power compensation in increasing the coverage of the RACH sequence. Hence, the present invention proposes a method of performing puncturing on a downlink control zone/uplink control zone to increase the coverage of the RACH sequence.

If it is assumed that an RACH sequence is transmitted on the center frequency of the N number of RBs (resource blocks) in an RACH subframe (in FIG. 12, third subframe from the left), a downlink control zone and an uplink control zone are punctured at the center frequency of the N number of RBs. For example, a base station does not schedule or allocate downlink control information and uplink control information at the center frequency of the N number of RBs.

If the uplink control information is not scheduled or allocated at the center frequency of the N number of RBs, it is able to have characteristics described in the following. In particular, it is able to transmit an RACH sequence from the timing of transmitting a downlink control signal to the timing of transmitting an uplink control signal. And, it is able to guarantee RTT as much as remaining duration resulted from subtracting maximum delay spread duration from CP duration. Although a downlink control signal and an uplink control signal are not transmitted on the center frequency of an RACH subframe in which an RACH sequence is transmitted, a downlink control signal and an uplink control signal are transmitted in a different RB. The base station receives an RACH sequence and an uplink control signal (or information) using a frequency division multiplexing (FDM) scheme. And, an RACH sequence is transmitted in uplink at the center frequency of a downlink control zone within an RACH subframe and downlink control information is transmitted in a region other than the center frequency of the downlink control zone. In particular, downlink and uplink coexist in the aspect of the same time. However, since an RACH is received by a base station only and a margin is put by a CP, downlink and uplink exist via FDM. Hence, it is able to perform simultaneous transmission.

Example of Designing Downlink/uplink Control-Puncturing Based RACH Subframe

Figure 13:
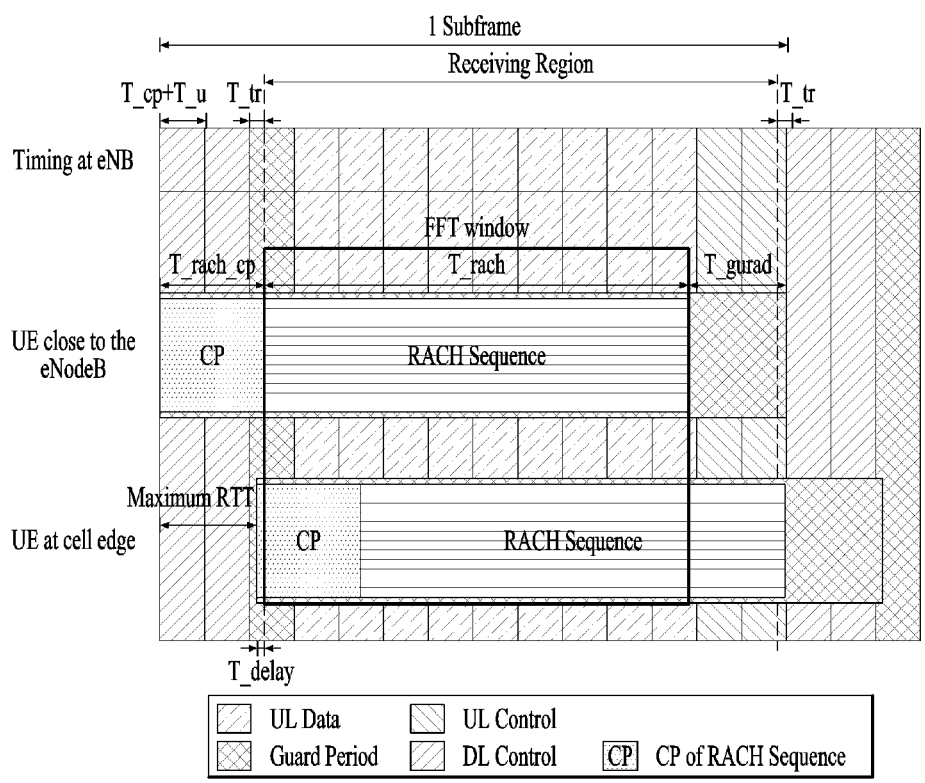
FIG. 13 is a diagram illustrating a downlink/uplink-puncturing based RACH subframe in the aspect of reception of a base station.

FIG. 13 is a diagram illustrating a downlink/uplink-puncturing based RACH subframe in the aspect of reception of a base station.

Referring to FIG. 13, a base station transmits a downlink control symbol (or information) in a region rather than the center frequency of the N number of RBs in a downlink control zone and receives an uplink control symbol (or information) in a region rather than the center frequency of the N number of RBs in an uplink control zone. A user or a UE close to the base station transmits an RACH from the timing at which downlink control information shown in FIG. 13 is transmitted on the basis of downlink synchronization (T_blank=0). If a cell edge user performs downlink synchronization at ½ time of maximum RTT and transmits an RACH in accordance with the downlink synchronization, as shown in FIG. 13, the base station receives an RACH signal after the maximum RTT. As shown in FIG. 13, if the base station determines a length of an FFT window for an RACH sequence in consideration of the user close to the base station, the base station is able to receive all RACH signals of users within the maximum RTT. In this case, the base station receives an RACH sequence for the N number of RBs in the uplink control zone and receives uplink in a different RB. In particular, the base station receives the RACH sequence and uplink control information in the uplink control zone using FDM scheme.

Embodiment 5: DL/UL Control-Puncturing Based Extended RACH Structure

In order to maximize coverage of an uplink synchronization signal of a self-contained frame structure, one embodiment of the present invention proposes two subframe RACHs via an extended RACH sequence in a structure of transmitting a downlink/uplink control zone by puncturing the downlink/uplink control zone. For clarity, a TDD new frame structure among the self-contained frame structure is explained as an example. As mentioned in the foregoing description, the present invention can be applied not only to the TDD new frame structure but also to an FDD new frame structure and the self-contained frame structure.

Figure 14:
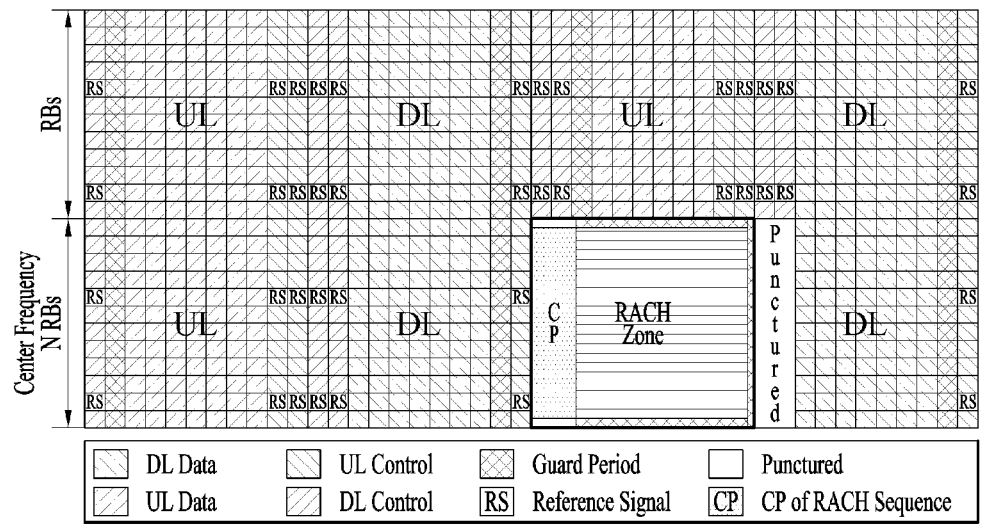
FIG. 14 is a diagram illustrating a concept of a downlink/uplink control-puncturing based extended RACH subframe of a TDD new frame structure.

FIG. 14 is a diagram illustrating a concept of a downlink/uplink control-puncturing based extended RACH subframe of a TDD new frame structure.

In general, the first n (n is an integer equal to or greater than 1) number of symbols in a subframe can be configured as a downlink control zone and the last m (m is an integer equal to or greater than 1) number of symbols in a subframe can be configured as an uplink control zone in a TDD new frame structure. If an RACH sequence having long duration is applied to secure uplink coverage, the RACH sequence is unable to invade the downlink control zone or the uplink control zone or is unable to be overlapped with the zones. Hence, when the number of symbols included in one subframe corresponds to M, a length of the RACH sequence corresponds to {M−(n+m)}*1 symbols. Then, it is necessary to design an RACH within duration of the {M−(n+m)}*1 symbols including a CP and a GP for the RACH sequence. However, when a transmit power difference between a base station and a UE is considered, the duration of the {M−(n+m)}*1 symbols may have insufficient power compensation in increasing the coverage of the RACH sequence. Hence, the present invention proposes a method of performing puncturing on a downlink control zone/uplink control zone to increase the coverage of the RACH sequence.

If it is assumed that an RACH sequence is transmitted on the center frequency of the N number of RBs (resource blocks) in an RACH subframe (in FIG. 12, third subframe from the left), a downlink control zone and an uplink control zone are punctured at the center frequency of the N number of RBs. For example, a base station does not schedule or allocate downlink control information and uplink control information at the center frequency of the N number of RBs.

If the uplink control information is not scheduled or allocated at the center frequency of the N number of RBs, it is able to have characteristics described in the following. In particular, it is able to transmit an RACH sequence from the timing of transmitting a downlink control signal to the timing of transmitting an uplink control signal. And, it is able to guarantee RTT as much as remaining duration resulted from subtracting maximum delay spread duration from CP duration. Although a downlink control signal and an uplink control signal are not transmitted on the center frequency of an RACH subframe in which an RACH sequence is transmitted, a downlink control signal and an uplink control signal are transmitted in a different RB. The base station receives an RACH sequence and an uplink control signal (or information) using a frequency division multiplexing (FDM) scheme. And, an RACH sequence is transmitted in uplink at the center frequency of a downlink control zone within an RACH subframe and downlink control information is transmitted in a region other than the center frequency of the downlink control zone. In particular, downlink and uplink coexist in the aspect of the same time. However, since an RACH is received by a base station only and a margin is put by a CP, downlink and uplink exist via FDM. Hence, it is able to perform simultaneous transmission.

Figure 15:
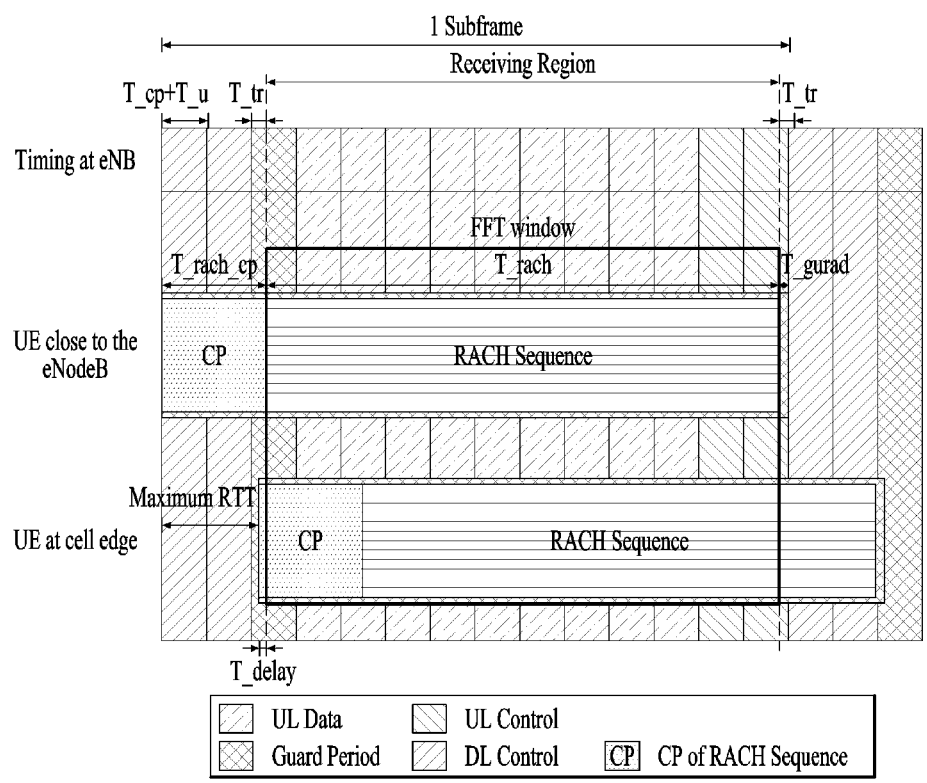
FIG. 15 is a diagram illustrating a concept of a downlink/uplink control-puncturing based extended RACH subframe in the aspect of reception of a base station.

Example of designing Downlink/Uplink Control-Puncturing Based Extended RACH Subframe FIG. 15 is a diagram illustrating a concept of a downlink/uplink control-puncturing based extended RACH subframe in the aspect of reception of a base station.

Referring to FIG. 15, a base station transmits a downlink control symbol (or information) in a region rather than the center frequency of the N number of RBs in a downlink control zone and receives an uplink control symbol (or information) in a region rather than the center frequency of the N number of RBs in an uplink control zone. A user or a UE close to the base station transmits an RACH from the timing at which downlink control information shown in FIG. 15 is transmitted on the basis of downlink synchronization (T_blank=0). If a cell edge user performs downlink synchronization at ½ time of maximum RTT and transmits an RACH in accordance with the downlink synchronization, as shown in FIG. 15, the base station receives an RACH signal (or sequence) after the maximum RTT. As shown in FIG. 15, if the base station determines a length of an FFT window for an RACH sequence in consideration of the user close to the base station, the base station is able to receive all RACH signals of users within the maximum RTT. In this case, the base station receives an RACH sequence for the N number of RBs in the uplink control zone and receives uplink in a different RB. In particular, the base station receives the RACH sequence and uplink control information in the uplink control zone using FDM scheme.

And, it is necessary to perform puncturing on a control zone of a next subframe until the timing at which a RACH sequence of a user corresponding to the maximum RTT ends due to an extended RACH sequence. In this case, if the RACH sequence does not invade a data zone of the next subframe, the data zone of the next subframe is not restricted to an uplink data zone.

The characteristics of the aforementioned 5 embodiments (Embodiments 1 to 5) can be simply represented as Table 2 in the following.

TABLE 2

| RACH Format | DL Control signal transmission | UL Control signal transmission | Coverage comparison | Note |
|---|---|---|---|---|
| Format 1 (Non-Puncturing) | possible | possible | Class 1 | |
| Format 2 (DL-Puncturing) | impossible | possible | Class 2 | Availability of region is degraded due to problem of reception availability timing of base station |
| Format 3 (UL-Puncturing) | possible | impossible | Class 3 | |
| Format 4 (DL/UL-Puncturing) | impossible | impossible | Class 4 | |
| Format 5 (DL/UL-Puncturing w/Extended RACH) | impossible (until $2^{nd}$ frame) | impossible | Class 5 | Although the number of RACH subframes becomes 2, data zone of $2^{nd}$ subframe is not restricted |

TABLE 2-continued

| RACH Format | DL Control signal transmission | UL Control signal transmission | Coverage comparison | Note |
|---|---|---|---|---|
| | | | | to UL data zone |

Behaviors of a UE or a user can be summarized as follows based on the RACH format.

Initial RACH UE

The UE recognizes a period of RACH and a RACH format defined in Table 2 based on broadcasted system information.

In case of RACH formats 2, 4, and 5, the UE is unable to receive DCI in a RACH subframe.

The UE transmits a RACH sequence in a RACH subframe using a given RACH format.

RRC connected UE

The UE recognizes a period of RACH and a RACH format defined in Table 2 based on broadcasted system information.

If a RACH is additionally transmitted for SR or synchronization in an RRC connected state, the UE is unable to receive DCI using the RACH subframe.

The UE does not perform decoding on a part of a punctured downlink control zone according to a given RACH format in RACH subframe.

The UE does not perform uplink transmission on a part of a punctured uplink control zone according to a given RACH format in RACH subframe.

In the method of the aforementioned embodiments, it is able to repeatedly and consecutively transmit an RACH sequence in a plurality of subframes to extend RACH coverage of the UE. In this case, it is able to apply the aforementioned 5 RACH formats and the formats are restricted to uplink for a plurality of subframes. In the foregoing description, although a transmission band of RACH is represented by the center frequency of the N number of RBs in frequency domain, if it is necessary to provide more connectivity according to system environment, a value of the N can be considerably increased. And, the transmission band of RACH is not restricted to the center frequency in frequency domain and the transmission band may exist in multiple frequency domains.

In the method of the aforementioned embodiments, if a RACH sequence is transmitted to a downlink control zone (RACH formats 2, 4 and 5), out-of-band emission of the RACH sequence may act as strong interference to a UE receiving a downlink control signal due to a near-far problem. Hence, a base station allocates a plurality of guard subcarriers (or carriers) between a band on which the downlink control signal is transmitted and a band on which the RACH sequence is transmitted to minimize the interference.

In the method of the aforementioned embodiments, if a RACH sequence is transmitted to a downlink control zone (RACH formats 2, 4 and 5), out-of-band emission of the RACH sequence may act as strong interference to a UE receiving a downlink control signal due to a near-far problem. Hence, a base station makes analog beam forming direction (or beam direction) for the downlink control signal to be different from analog beam forming direction for RACH reception to minimize interference. For example, when the base station is able to select direction of an analog beam from among A direction and B direction, if analog beam forming direction of a downlink control signal of a RACH subframe corresponds to the A direction, it may be able to define a RACH format in advance to transmit RACH in the B direction. If there are various analog beamforming directions, a base station predefines a RACH to be transmitted in a region corresponding to a beam direction having a biggest difference with a beam forming direction for which a downlink control signal is transmitted.

In the method of the aforementioned embodiments, if a direct-conversion receiver is used, a null signal is inserted into a DC subcarrier corresponding to a center frequency subcarrier to solve a performance deterioration problem due to a DC offset. In particular, if a RACH zone exists at the center frequency of the N number of RBs, a RACH sequence is not transmitted on a DC subcarrier. And, the DC subcarrier is not numbered on the center frequency of the N number of RBs.

In the method of the aforementioned embodiments, if a base station is able to inform a UE of a RACH zone before a RACH process is performed (e.g., the base station can broadcast information on the RACH zone to the UE via a physical broadcast channel (PBCH) or a system information block (SIB) of LTE system), the RACH zone may not be restricted to the center frequency of the N number of BRs. For example, if the base station defines the information on the RACH zone (information on RACH subframe/RB, etc.) in advance and informs the UE of the information, the UE can transmit a RACH sequence in a specific RB of a notified RACH subframe.

In the method of the aforementioned embodiments, the base station can inform the UE of a RACH subframe using a relationship with a period of a PBCH subframe. For example, (1) if a PBCH is transmitted in every 2 ms (10 subframes), a RACH zone can be set to a next subframe of the PBCH. (2) If RACH is more intermittently transmitted compared to a period of a PBCH, a field indicating information on a RACH subframe is added to information on the PBCH to make the UE know that a RACH zone is allocated to a prescribed subframe after the field is received. If a RACH zone is published on the PBCH via the method above, since time taken for performing RRC connection with the UE is reduced (SIB reception time or delay for a period is reduced), it is able to achieve low latency. Moreover, since a procedure after initial access (synchronization, system information, random access) quickens, a case for a base station to transmit and receive data via cell-specific information is reduced. Hence, it is able to reduce common control information and increase dynamic utilization of a resource via user-specific information.

In the foregoing description, a method of designing RACH has been proposed to maximize DL/UL flexibility of a self-contained frame structure and uplink synchronization coverage. When extension of a length of an RACH sequence is inevitable to compensate for an uplink/downlink power difference, since a TDD new frame structure includes a downlink control zone/uplink control zone in every subframe, the TDD new frame structure can solve a problem of setting a limit on length extension of a RACH sequence by performing puncturing on a downlink control zone and/or an uplink control zone.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting a random access channel (RACH) signal in a wireless communication system and a user equipment therefor can be applied to various wireless communication systems including 3GPP LTE/LTE-A, 5G system, and the like.

What is claimed is:

1. A method for transmitting a random access channel (RACH) signal by a user equipment in a wireless communication system, the method comprising:
   transmitting the RACH signal to a base station based on a RACH format related to a specific RACH subframe in predefined RACH formats,
   wherein each of the predefined RACH formats is configured to distinguish a starting point or an ending point of the RACH signal,
   wherein the starting point or the ending point of the RACH signal is configured based on whether a downlink control zone and an uplink control zone are punctured on a specific frequency band in the specific RACH subframe.

2. The method of claim 1, further comprising:
   receiving information on the predefined RACH formats from the base station.

3. The method of claim 1, wherein the RACH format related to the specific RACH subframe corresponds to a format that the downlink control zone and the uplink control zone are not punctured on the specific frequency band in the specific RACH subframe and wherein the RACH signal is transmitted from a symbol appearing after the downlink control zone based on the RACH format.

4. The method of claim 1, wherein the RACH format related to the specific RACH subframe relates to a format that the downlink control zone is punctured only on the specific frequency band in the downlink control zone and the uplink control zone in the specific RACH subframe and wherein the RACH signal is transmitted from a first symbol of the downlink control zone based on the RACH format.

5. The method of claim 1, wherein the RACH format related to the specific RACH subframe corresponds to a format that the uplink control zone is punctured only on the specific frequency band in the downlink control zone and the uplink control zone in the specific RACH subframe and wherein the RACH signal is transmitted in symbol duration corresponding to the uplink control zone from a symbol appearing after the downlink control zone based on the RACH format.

6. The method of claim 1, wherein the RACH format related to the specific RACH subframe relates to a format that both the downlink control zone and the uplink control zone are punctured on the specific frequency band in the specific RACH subframe and wherein the RACH signal is transmitted in duration ranging from a symbol appearing after the downlink control zone to a symbol before the uplink control zone based on the RACH format.

7. The method of claim 1, wherein the specific frequency band relates to a center frequency of a prescribed number of resource blocks (RBs) and wherein the RACH signal is transmitted on the center frequency.

8. The method of claim 1, further comprising:
   receiving, from the base station, at least one of allocation information of the specific RACH subframe for transmitting the RACH signal and information on the specific frequency band.

9. The method of claim 3, wherein the RACH signal contains a CP (cyclic prefix) and a RACH sequence.

10. The method of claim 1, wherein the user equipment relates to a user equipment performing initial access RACH.

11. A user equipment for transmitting a random access channel (RACH) signal in a wireless communication system, the user equipment comprising:
    a transmitter; and
    a processor,
    wherein the processor configured to control the transmitter to transmit the RACH signal to a base station based on a RACH format related to a specific RACH subframe in predefined RACH formats,
    wherein each of the predefined RACH formats is configured to distinguish a starting point or an ending point of the RACH signal,
    wherein the starting point or the ending point of the RACH signal is configured based on whether a downlink control zone and an uplink control zone are punctured on a specific frequency band in the specific RACH subframe.

12. The user equipment of claim 11, further comprising a receiver,
    wherein the processor is configured to control the receiver to receive information on the predefined RACH formats from the base station.

13. The user equipment of claim 11, wherein the RACH format related to the specific RACH subframe relates to a format that the downlink control zone and the uplink control zone are not punctured on the specific frequency band in the specific RACH subframe and wherein the processor is configured to control the transmitter to transmit the RACH signal from a symbol appearing after the downlink control zone based on the RACH format.

14. The user equipment of claim 11, wherein the RACH format related to the specific RACH subframe relates to a format that the downlink control zone is punctured only on the specific frequency band in the downlink control zone and the uplink control zone in the specific RACH subframe and wherein the processor is configured to control the transmitter to transmit the RACH signal from a first symbol of the downlink control zone based on the RACH format.

15. The user equipment of claim 11, wherein the RACH format related to the specific RACH subframe relates to a format that the uplink control zone is punctured only on the specific frequency band in the downlink control zone and the uplink control zone in the specific RACH subframe and wherein the processor is configured to control the transmitter to transmit the RACH signal in symbol duration corresponding to the uplink control zone from a symbol appearing after the downlink control zone based on the RACH format.

16. The user equipment of claim 11, wherein the RACH format related to the specific RACH subframe relates to a format that both the downlink control zone and the uplink control zone are punctured on the specific frequency band in the specific RACH subframe and wherein the processor is configured to control the transmitter to transmit the RACH signal in duration ranging from a symbol appearing after the downlink control zone to a symbol before the uplink control zone based on the RACH format.

* * * * *